Nov. 2, 1954 G. A. HEMPEL 2,693,203
GATED VALVE

Filed Feb. 3, 1954 2 Sheets-Sheet 1

INVENTOR.
Gustav A. Hempel
BY Green, McCallister & Miller
HIS ATTORNEYS

Nov. 2, 1954  G. A. HEMPEL  2,693,203
GATED VALVE
Filed Feb. 3, 1954  2 Sheets-Sheet 2

INVENTOR.
Gustav A. Hempel
BY Green, McCallister & Miller
HIS ATTORNEYS

United States Patent Office 2,693,203
Patented Nov. 2, 1954

2,693,203

GATED VALVE

Gustav A. Hempel, Pittsburgh, Pa., assignor to McDowell Manufacturing Company, Millvale, Pa., a corporation of Pennsylvania Application February 3, 1954, Serial No. 407,916

12 Claims. (Cl. 137—625.38)

This invention relates to a gated valve or unit and particularly, to an adjustable control and shut-off valve for supplying liquids from a housing or pipe member, such as used in irrigating crop rows.

In irrigating crop rows, a length of pipe is laid transversely of a series of longitudinally-extending row plantings which have a suitable transverse spacing with respect to each other. The tubing or pipe line is provided with fluid feed or discharge openings, usually of about 40 inch spacing, in alignment with the spacing between the crop rows to supply irrigating water therealong. Means is provided, such as a valve unit, for controlling and shutting off fluid flow from each of the discharge openings that are usually horizontally positioned in the side wall of the pipe line. In this manner, the amount of water supplied may be proportioned to actual requirements from the standpoint of the nature of the crop, the depth of its roots, etc., and from the standpoint of the type and intensity of irrigating action desired.

Valve units heretofore used for this purpose have not been entirely satisfactory. In the first place, difficulty has been encountered in inserting and mounting the valve units through openings in the side wall of a tubing housing member or pipe section. In the second place, valve units heretofore used have been of a type such that they are subject to damage when the pipe section is transported or removed from one place to another. In the third place, difficulty has been encountered in fully shutting-off their valves and in operating them due to silt or dirt jamming.

As to the first-mentioned factor, it has been customary to cut a hole from the outside through the side wall of the pipe section and this poses the problem of properly mounting the valve unit without, as customary, working both from the outside of the pipe and from its inside through its open end. It will be apparent that it is highly desirable to be able to mount the valve unit entirely from the outside of the pipe section or tubing, since the discharge or feed openings are to be provided along the length of the pipe section and at points remote from its ends.

One type of valve unit heretofore employed requires a special type of elongated slot or slit in the fluid-carrying housing member, as distinguished from a round or circular hole, and this, in itself, complicates the installation, since difficulty is encountered in providing a slit of the requisite dimensions and in providing suitable tools for this purpose. This, of course, is distinguished from the ease of drilling out a round hole through the wall of a pipe or tubing section constituting the fluid-carrying housing member. A valve of this type has a gasketed clamping member which fits on the inside of the pipe wall and a gasketed slide operatively mounted on the outside of the pipe wall to open and close off the opening therein. Difficulty has been encountered with this type, not only in mounting it, but in its tendency to become jammed and stay in a given position and aside from its rather poor sealing-off action.

Another type of valve unit employs a mounting clamp assembly similar to that used in connection with an automobile tire valve assembly. Like the first-mentioned type, it is somewhat difficult to mount in position and has a tendency to lose its sealing effectiveness with usage and to become damaged, thus adversely effecting the operation of its valve element.

It has thus been an object of my invention to provide a new and improved form of gated valve or unit which will meet the above mentioned factors and solve the problem heretofore presented.

Another object of my invention has been to provide a gated valve or unit of the type that is exceptionally easy to install, that can make use of a round hole, that is easy to adjust and highly efficient in its sealing-off action when in a closed position.

A further object of my invention has been to provide a new and improved form of valve unit which can be manually controlled externally of a pipe member on which it is mounted, which can be mounted and dismounted with respect to the pipe member entirely from the outside of the pipe member, and which can be easily and effectively moved from various fluid-flow controlling positions to a closed position and in such closed positions will have a sealing action that is proportional to the fluid pressure involved.

A still further object of my invention has been to provide a gated valve unit which will be substantially incapable of being damaged in usage and will withstand jamming and locking due to dirt and silt pick-up.

These and many other objects of my invention will appear to those skilled in the art from the disclosure thereof.

In the drawings:

Figure 4 shows the valve in a fully closed and positive fluid sealing-off position;

Figure 1:
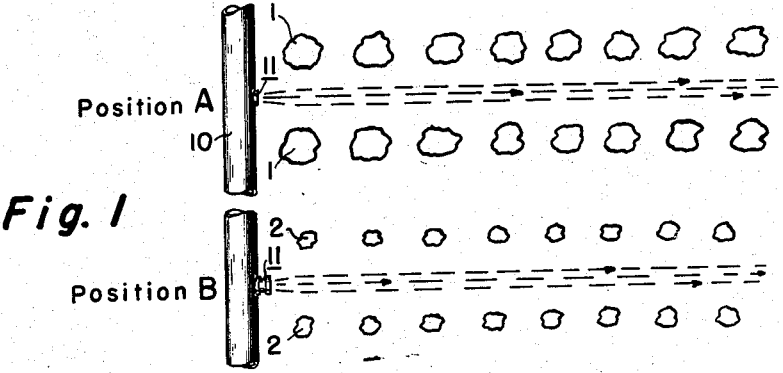
Figure 1 is a somewhat diagrammatic plan view of a crop row system illustrating how a valve unit of my invention may be employed; this view is on a reduced scale with respect to the following figures.

Referring particularly to Figure 1, I have shown a fluid-carrying housing member in the form of a pipe or tubing section or member 10 laid transversely of crop rows for supplying irrigating water between and along such rows. In this connection, rows 1 represent a relatively deep-rooted crop to which a greater supply of water may be safely supplied, and rows 2 represent relatively a more shallow crop of a type requiring a lesser amount of water to prevent damage to the roots that may be close to the surface. Thus, Position A of valve units 11 may be employed for the rows 1 and an intermediate or partially open Position B may be used for the valve units 11 which are employed for irrigating rows 2.

In solving the problem heretofore presented in the art, I have devised a somewhat cup or sleeve-like cylindrical form of body for the valve member or unit 11 made in integral form, as by molding or casting, and from a relatively soft elastic or resilient material, such as natural or synthetic rubber. Such a valve can be utilized with a fully circular, drilled-out wall edge 10a of an open portion of the housing member 10 and can be easily inserted or removed therefrom when fluid pressure is off, by flexing or distorting its inner annular sealing rim or flange portion 12a which is carried by its closing end wall 12. This can be easily done by inserting the rim flange portion 12a at an angle through the hole and then squeezing or flexing it until it attains the fully closed or maximum outward positioning of Figure 4.

It will thus be apparent that the valve 11 of my invention can be inserted into an opertaive mounted position entirely from the outside of the wall of the housing member and immediately adjacent the wall edges 10a thereof and can be easily removed therefrom for replacement purposes. It is of a type that cannot be damaged by rough usage in handling the member 10, such as involved in a portable system, where the member may be moved from one location to another by dragging, by hand, or on a truck or carrier. Further, as particularly illustrated in Figure 4, the sealing rim or flange portion 12a will have a sealing action upon inner seating surface portions of the open wall portion of member 10 that is fully positive and effective, since it works from the inside of the wall of the pipe 10, and since fluid pressure in the pipe will tend to translate its force through such resilient flange portion to a proportional sealing action.

Figure 2:
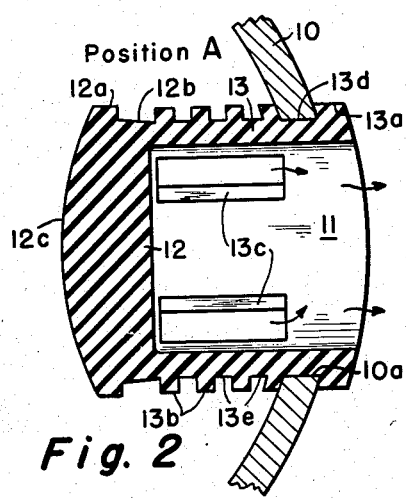
Figure 2 is a cross-sectional view in elevation through a valve unit of my invention in a fully open position with respect to the housing wall in which it is mounted.

As illustrated particularly in Figures 2 to 9, inclusive, the body of the valve unit 11, in addition to the closed end mounting, sealing-off, or base wall 12 with the rim flange portion 12a thereabout, has an adjacent annular, frusto-conical valley or sealing neck portion 12b which slightly diverges inwardly towards or into the end wall 12, and converges outwardly towards a longitudinal side wall or shell 13 of general cylindrical construction or shape. The end or top of the end wall 12 is reinforced by a domed or convex outer portion 12c. The body and thus its side wall 13 has an outer open end provided with an outer rim flange portion 13a which serves as a limit stop for the maximum open, inward positioning of the unit 11, as shown in Figure 2 of the drawings.

It will be noted that the rim flange portion 13a is of slightly smaller outer diameter than the portion 12a, but that it is fully effective in combination with an adjacent, annular, positioning valley or sealing neck portion 13d. The side wall 13 also carries two pairs of opposed wall segments or portions, see Figure 9. One pair of opposed wall portions has a series of longitudinally spaced-apart circumferentially-extending, outwardly-projecting, and convexly or elliptically-shaped positioning rib portions or segments 13b.

Figure 3:
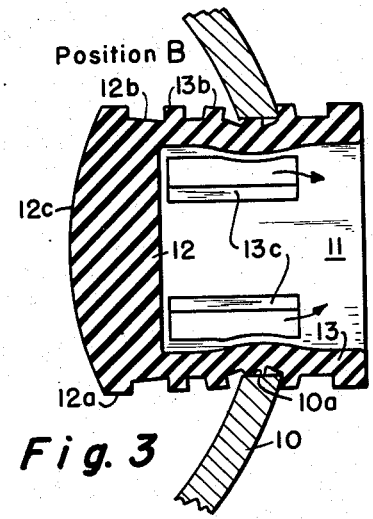
Figures 3 and 4 are views similar to Figure 2, except that Figure 3 shows the valve in an adjusted partially open position
Figure 8:
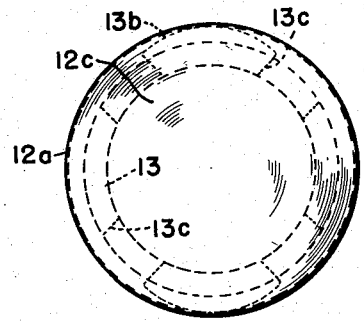
Figure 8 is a top plan view taken along the line VIII—VIII of Figure 6.
Figure 9:
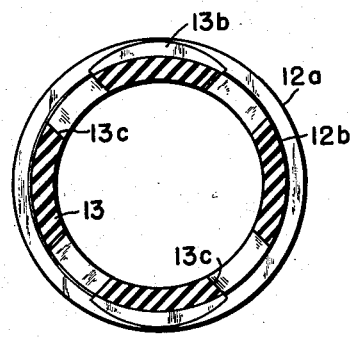
Figure 9 is a horizontal section taken along the line IX—IX of Figure 6.

As shown particularly in Figures 8 and 9, the rib portions 13b serve as positioning ribs which are flexibly distortable, as illustrated in Figure 3, to securely hold the valve unit 11 in an adjusted fluid-control position and to seal off fluid flow between the wall edges 10a and the side wall 13 of the valve body. It will also be noted that the longitudinal width or spacing of valley portions or annular segments 13e between the rib portions 13b is substantially less than the thickness of the wall section of the member 10. This provides an elastic, but fully effective sealing fit with wall edges 10a of the housing member.

It will be further noted that the longitudinal spacing or width of the annular neck portion 12b between the annular rim flange portion 12a and the immediately adjacent rib portion 13b approximates, but is slightly less than the wall thickness of the member 10, as does and is the longitudinal spacing or width of the annular neck portion 13d between the annular rim flange portion 13a and an immediately adjacent rib 13b. As a result, the wall edges 10a are resiliently sealed or held in position with or upon the portions 12b and 13d, see Figures 2 and 4. The spacing of the valley portions between ribs 13b is thus substantially less than that of the rim flanges 12b and 13d and approximates about one half of the latter.

To provide for fluid flow, the side wall 13 has, as shown, a series of opposed pairs of longitudinally-extending or elongated flow window or fluid passageway portions 13c therealong from the closed base wall 12 to substantially the positioning of the last rib 13b which lies adjacent the annular slot or valley portion 13d. As disclosed particularly in Figure 9, two pairs of the open portions 13c are provided and as disclosed particularly in Figures 2 and 3, the effective amount of fluid flow (flow area) from the inside of the housing member 10 will depend upon the inward or outward adjustment of the valve body, i. e., upon whether or not the window portions 13c are fully open to the inside of the pipe member, as disclosed in Figure 2, or are partially open, as disclosed in Figure 3.

Figure 4:
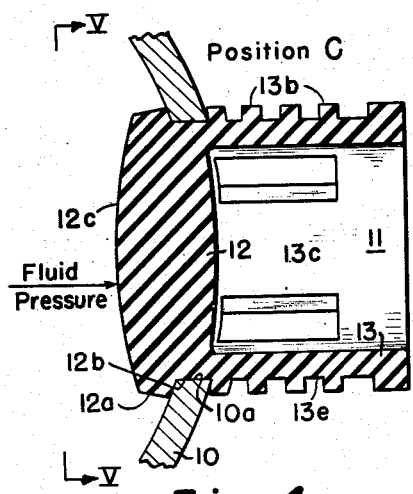
Figure 5:
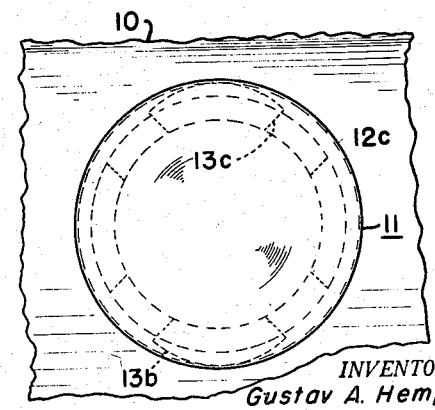
Figure 5 is an end view taken along the line V—V of Figure 4 and also shows the valve in a closed position.
Figure 6:
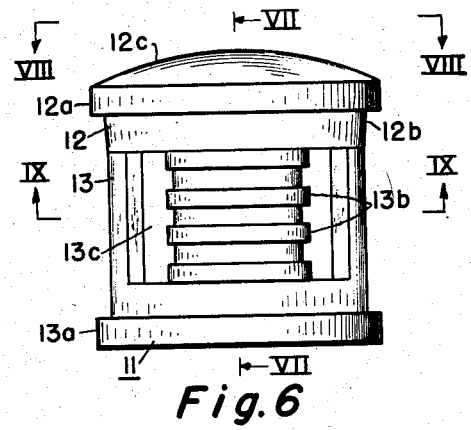
Figure 6 is a side view in elevation of the valve unit of my invention when positioned on a horizontal plane with its open end portion adjacent such plane; the figure is on the same scale of Figures 2 to 5, inclusive.
Figure 7:
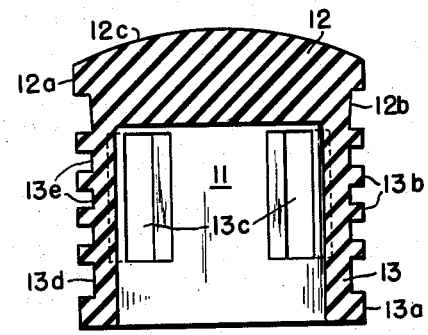
Figure 7 is a vertical section along the line VII—VII of Figure 6 and on the same scale as Figure 6.

To facilitate the positive fluid sealing-off action of the annular rim flange portion 12a, I provide the wall base 12 with the dome portion 12c, see particularly Figures 2 and 3, such that it, in effect, defines a fluid pressure area (an increased area of material) that is sensitive to the amount of fluid pressure and tends to transversely or radially spread the rim flange 12a, rather than collapse it longitudinally-axially or radially-inwardly under the application of a moderate amount of fluid pressure, see Figure 4.

In the drawings I have shown the valve unit 11 in a full scale that has been found suitable for its utilization with a two inch diameter hole or open portion between wall edges 10a and which may be used with a housing member having a diameter of six inches up to about ten inches or larger. In an irrigating system of the type here involved, the maximum liquid pressure may be relatively low, say on an average of about twenty pounds per square inch, although the valve unit disclosed in Figures 2 to 9 has been found to be fully effective with pressures of up to about 70 pounds per square inch.

Figure 10:
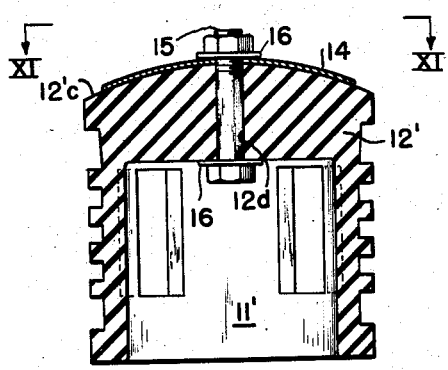
Figure 10 is a vertical section similar to Figure 7 of a modified form of valve unit which may be employed where higher pressures are to be utilized.
Figure 11:
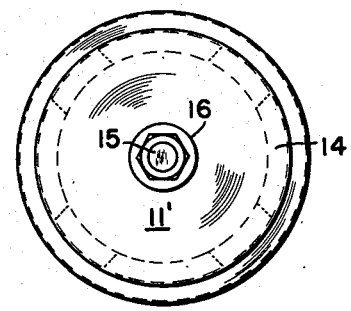
Figure 11 is a top plan view taken along the line XI—XI of Figure 10.

For a system employing pressures higher than approximately 70 pounds per square inch, I have illustrated a modified construction in Figures 10 and 11, whose base portion is, in effect, reinforced by a plate member 14, preferably of a non-corrosive material such as aluminum or plastic. Such a valve construction has been found to be fully effective with pressures up to 200 pounds per square inch and more. In Figures 10 and 11, the valve unit 11' is of the same general construction as the unit 11 which has been previously described, except that its base wall 12' is drilled out at 12d to receive a bolt and nut assembly 15. Such bolt and nut assembly carries the plate 14 whose diameter will be about 1/64 of an inch smaller than the size of the hole in the housing member 10 to permit the easy insertion and removal of the unit 11' from such member. As disclosed in Figure 10, the bolt and nut assembly 15 may have suitable washers 16 and carries a relatively thin-wall plate member 14 which is of somewhat flexible construction, but of lesser flexibility than the wall 12, so that it may also flex somewhat with the application of fluid line pressure. I have determined that the reinforcing plate or packing member 14 prevents the base 12' and its dome portion 12c, from being distorted, under very high pressures, to such an extent that it will concave the dome portion 12'c and draw-in the flange 12a to release the unit 11'.

The ribs 13b serve to prevent the valve body from being moved outwardly for its set or adjusted positioning with respect to the wall edges 10a during the controlled flow of fluid or water from the housing member 10 and to also act as positive seals with the other pair of segments of the wall 13 as to the wall edges 10a. Thus, the valve body can only be adjusted by manually distorting it and its ribs 13b.

What I claim is:

1. A gated valve unit to be inserted into operative engagement with and to be positioned for inward and outward adjustment with respect to wall edges of an open wall portion of a fluid-carrying housing member which comprises, a cup-shaped body having an extending side wall and a closed-off end wall, said body having an open end portion at its opposite end, a flexible sealing rim flange about said body adjacent said end wall for insertion past the wall edges into the housing member, said rim flange seating upon inner surface portions of the open wall portion when said body is moved to a fluid flow closing-off position with respect to the wall edges, at least one fluid passageway portion through and along said side wall and having an effective flow area that is controlled by adjusting the positioning of said body with respect to the wall edges, and flexible means on said body to engage the wall edges and hold said body in an adjusted position and seal off fluid flow between said side wall and the wall edges.

2. A gated valve as defined in claim 1 wherein said flexible means comprises rib segments projecting outwardly from said side wall.

3. A gated valve as defined in claim 1 wherein, said body, said rim flange and said flexible means are of resilient material, and a stop-limit rim flange is positioned about said body adjacent said open end portion thereof to abut against outer surface portions of the open wall portion when said body is moved to a maximum open position with respect to the wall edges.

4. A gated valve unit to be inserted into operative engagement with and to be positioned for inward and outward adjustment with respect to wall edges of an open wall portion of a fluid-carrying housing member which comprises, a sleeve-like body having a longitudinally-extending side wall and a closed-off inner end wall, said side wall having an open outer end portion, a flexible sealing rim flange about said end wall to engage upon an inner seating surface about the wall edges of the open wall portion and close-off fluid flow from the housing member when said body has a maximum outward positioning with respect to the wall edges, at least one fluid passageway portion through and along said side wall, said passageway portion having an effective flow area that is controlled by adjusting the positioning of said body with respect to the wall edges, and spaced-apart flexible peripheral rib portions on said side wall to engage the wall edges of the housing member and position said body in an adjusted fluid-flow position with respect thereto.

5. A gated valve unit as defined in claim 4 having a flexible rim flange about its open outer end portion to limit a maximum inward positioning of said body with respect to the wall edges.

6. A gated valve unit as defined in claim 4 wherein said inner end wall is convexly-shaped outwardly and is distortable upon an application of fluid pressure to the housing member to move said inner rim flange into a radially-expanded seating engagement with the inner seating surface.

7. A gated valve unit as defined in claim 6 wherein a reinforcing element of lesser flexibility than said inner end wall is positioned thereupon to control the distortion of said end wall upon an application of fluid pressure to the housing member.

8. A gated valve unit to be operatively mounted in sealing engagement with wall edges of an open wall portion of a fluid-carrying housing member and to be adjusted inwardly and outwardly in position with respect to the wall edges which comprises, a resilient sleeve-like body having a longitudinally-extending side wall and a closed-off inner end wall, said side wall having an open outer end, a resilient inner sealing rim flange about said inner end wall to engage upon an inner seating surface about the wall edges of the open wall portion and close-off fluid flow from the housing member through said body when said body is in a maximum outward position with respect to the wall edges, a series of peripherally spaced-apart fluid passageway portions through and along said side wall portion, each of said passageways having an effective flow area that is controlled by longitudinally adjusting the inward positioning of said body with respect to the wall edges, and longitudinally spaced-apart resilient peripheral rib portions on said side wall to seal-engage the wall edges and position said body in an adjusted fluid-flow position with respect thereto.

9. A gated valve unit to be distorted into an operatively-mounted engagement with wall edges of an open wall portion of a fluid-carrying housing member and to be adjusted longitudinally in position with respect to the wall edges which comprises, a resilient sleeve-like body having a longitudinally-extending side wall and a closed-off inner end wall, said side wall having an open outer end, an inner resilient sealing rim flange about said end wall to be distorted into position behind an inner seating surface about the wall edges, at least one fluid passageway portion through and longitudinally along said side wall portion, said passageway portion terminating in a longitudinal-outward spaced relationship with said inner rim flange to define an inner annular sealing neck portion about said side wall adjacent said inner rim flange, said passageway portion terminating in a longitudinal-inward spaced relationship with respect to the open end of said body to define an outer annular sealing neck thereabout, a resilient outer rim flange about the open end of said body adjacent said outer sealing neck to limit the maximum inward longitudinal adjustment of said body with respect to the housing member, resilient radially-projecting fluid-sealing portions on said side wall in substantial alignment with the longitudinal extent of said passageway portion to engage the wall edges and hold said body in a fluid-flow control position when said body has been longitudinally adjusted with respect to the housing member, and said passageway portion having an effective flow area that is controlled by adjusting the longitudinal positioning of said body with respect to the wall edges.

10. A gated valve unit as defined in claim 9 wherein, said inner end wall is of thickened construction and has an outer convexly-shaped surface, and said inner sealing neck diverges longitudinally towards said inner rim flange.

11. A gated valve unit as defined in claim 9 wherein, said inner end wall is of thickened construction and has an outer convexly-shaped surface portion, and a convexly-shaped element of thin section and flexible construction is secured in a reinforcing relationship over the convexly-shaped surface portion of said end wall.

12. A gated valve unit to be operatively mounted in engagement with wall edges of an open wall portion of a fluid-carrying housing member and to be longitudinally adjusted from a fluid-flow closing-off position with the housing member to fluid flow positions with respect thereto which comprises, a resilient sleeve-like body having a longitudinally-extending side wall and a closed-off inner end wall, said side wall having an open outer end, an inner resilient annular sealing rim flange about said end wall to engage upon an inner seating surface about the wall edges when said body is in a maximum longitudinal outward position with respect to the housing member to close-off fluid flow from the housing member through said body, a series of longitudinally-extending window-like fluid-flow passageway portions through said side wall in a transversely spaced-apart relationship with each other, said passageway portions terminating in a spaced relationship from the open outer end of said body, each of said passageway portions having an effective flow area that is controlled by longitudinally adjusting the positioning of said body with respect to the wall edges, a series of elliptical-like resilient rib segments in a longitudinally spaced-apart relationship on said side wall and extending in a peripheral direction thereon and located in substantial alignment with the longitudinal extent of said passageways, an outer resilient annular rim flange about the open end of said side wall and positioned outwardly of said passageways to limit the maximum open-flow inward positioning of said body with respect to the housing member, an inner valley portion between said inner sealing rim flange and said rib portions, said inner valley portion having a relatively wide longitudinal spacing to approximate the thickness of the wall of the housing member, an outer valley portion between said outer rim flange and said rib segments and having substantially the same longitudinal extent as said inner valley portion, and said rib segments having valley-portion-defining longitudinal spacing with respect to each other that is substantially smaller than the extent of said inner and outer valley portions.

No references cited.